(12) United States Patent
Sworn et al.

(10) Patent No.: US 6,602,996 B1
(45) Date of Patent: Aug. 5, 2003

(54) MODIFIED GELLAN GUM COMPOSITION PROCESS FOR PREPARATION OF SAME AND USE THEREOF

(75) Inventors: Graham Sworn, Sutton (GB); You-Lung Chen, San Diego, CA (US); Neil A. Morrison, San Diego, CA (US); Todd Talashek, San Diego, CA (US); Ross Clark, San Diego, CA (US)

(73) Assignee: CP Kelco U.S., Inc., Wilmington, DE (US)

( * ) Notice: Subject to any disclaimer, the term of this patent is extended or adjusted under 35 U.S.C. 154(b) by 0 days.

(21) Appl. No.: 09/719,187

(22) PCT Filed: May 21, 1999

(86) PCT No.: PCT/EP99/03499

§ 371 (c)(1), (2), (4) Date: Jan. 8, 2001

(87) PCT Pub. No.: WO99/64468

PCT Pub. Date: Dec. 16, 1999

(30) Foreign Application Priority Data

Jun. 10, 1998 (EP) .............................................. 98870131

(51) Int. Cl.$^7$ .......................... C07G 17/00; C08B 37/00
(52) U.S. Cl. ....................... 536/114; 426/573; 426/575; 536/18.5; 536/52; 536/115; 536/123.1; 536/124
(58) Field of Search ................................ 426/573, 575; 536/18.5, 52, 114, 115, 123.1, 124

(56) References Cited

U.S. PATENT DOCUMENTS

| | | | |
|---|---|---|---|
| 4,326,052 A | | 4/1982 | Kang et al. |
| 4,326,053 A | | 4/1982 | Kang et al. |
| 4,377,636 A | | 3/1983 | Kang et al. |
| 4,385,123 A | | 5/1983 | Kang et al. |
| 4,503,084 A | * | 3/1985 | Baird et al. .................. 426/573 |
| 6,048,564 A | * | 4/2000 | Young et al. ................ 426/573 |

FOREIGN PATENT DOCUMENTS

| | | | |
|---|---|---|---|
| EP | 0012552 | 6/1980 | |
| EP | 0 526 926 A2 | * 10/1993 | ........... C08B/37/00 |
| JP | 02 145159 | 8/1990 | |
| JP | 02 207769 | * 10/1990 | |

OTHER PUBLICATIONS

Kang, Kenneth S. et al., "Agar–Like Polysaccharide Produced by a Pseudomonas Species: Production and Basic Properties, Applied and Environmental Microbiology", May 1982, pp. 1086–1091, vol. 43, No. 5.

O'Neill, Malcolm A. et al., "Structure of the Acidic Extracellular Gelling Polysaccharide Produced by Pseudomonas elodea", Carbohydrate Research, 124, (1983), pp. 123–133.

Jannson, Per–Erik et al., "Structural Studies of GellanGum, an Extracellular Polysaccharide Elaborated by Pseudomonas elodea", Carbohydrate Research, 124, (1983) pp. 135–139.

Grasdalen, Hans et al., "Gelation of Gellan Gum", Carbohydrate Polymers, 7, (1987) pp. 371–393.

Chandrasekaran, Rengaswam et al., "The Crystal Structure of Gellan", Carbohydrate Research, 175, (1988) pp. 1–15.

Baird, J.K. et al., Proc. 6$^{th}$ International Conference on Gums and Stabilisers for the Food Industry, Wrexham, Clwyd, Wales, Jul. 1991– Edited Phillips G.O., et al., published by IRL Press at OUP (1992), pp. 479–487.

Bourne, Malcolm C., (1978), "Texture Profile Analysis", Food Technology, Jul., 1978, 32, pp. 67–72.

Jay, A.J. et al., Analysis of structure and function of gellans with different substitution patterns:, Carbohydrate Polymers, 35, (1998), pp. 179–188.

Morris, E.R. et al., "Conformational and rheological transitions of welan, rhamsan and acylated gellan", Carbohydrate Polymers, 30, (1996), pp. 165–175.*

* cited by examiner

Primary Examiner—James O. Wilson
Assistant Examiner—Patrick Lewis
(74) Attorney, Agent, or Firm—Banner & Witcoff, Ltd.

(57) ABSTRACT

The invention relates to a modified gellan gum in which the total acyl content as well as the ratio of acyl substituent groups to glycerate substituent groups per linear saccharide repeat unit is altered to be higher than 1. The invention further relates to a process for the modification of a gellan gum to alter its acyl content in which the gum is treated with a weak base such as sodium or potassium carbonate or a suitable phosphate. The process enables "tailor made" gums having appropriate setting temperatures and theological properties to be made. Novel compositions containing them are also claimed.

8 Claims, 3 Drawing Sheets

MODIFIED GELLAN GUM COMPOSITION PROCESS FOR PREPARATION OF SAME AND USE THEREOF

BACKGROUND OF THE INVENTION

1. Field of the Invention

This invention relates to new modified gellan gum compositions that show particular effects as well as to a process for the modification of gellan. The invention also relates to a process for the production of a gellan gum-containing product having a food or non-food application and to a gum-containing product which comprises such a novel modified gellan gum.

2. Description of Related Art

Gums, also called hydrocolloids, are polysaccharides. Polysaccharides are polymers of simple sugar building blocks which have been in use since about 1900. Use of gums has increased throughout the century particularly in the past 40 years and today they are used in a wide variety of products and processes. Certain micro-organisms are capable of producing polysaccharides with properties differing from those of gums from more traditional sources. The best example of such microbially-produced polysaccharides is xanthan gum. More recently discovered examples are welan gum, rhamsan gum and gellan gum.

Gellan gum, first discovered in 1978, is produced by strains of the species *Sphingomonas Elodea* [formerly *Pseudomonas Elodea*], in particular strain ATCC 31461 [Kang, K. S. et al EP 12552 and U.S. Pat. Nos. 4,326,052; 4,326,053; 4,377,636 and 4,385,125]. Commercially this gum is produced as an extracellular product by aqueous cultivation of the micro-organisms in a medium containing appropriate carbon, organic and inorganic nitrogen and phosphate sources and suitable trace elements. The fermentation is carried out under sterile conditions with strict control of aeration, agitation, temperature and pH [Kang et al, Appl. Environ. Microbiol., 43, [1982], 1086]. When fermentation is complete, the produced viscous broth is pasteurised to kill viable cells prior to recovery of the gum. The gum can be recovered in several ways. Direct recovery from the broth yields the gum in its native or high acyl [HA] form. Recovery after deacylation by treatment with a base yields the gum in its low acyl [LA] form. Acyl groups present in the gum are found to influence its characteristics significantly.

The constituent sugars of gellan gum are glucose, glucuronic acid and rhamnose in the molar ratio of 2:1:1. These are linked together to give a primary structure comprising a linear tetrasaccharide repeat unit [O'Neill M. A., et al, Carbohydrate Res., 124, [1983], 123 and Jansson, P. E., et al., Carbohydrate Res., 124, [1983], 135]. In the native or high acyl [HA] form two acyl substituents, acetate and glycerate, are present. Both substituents are located on the same glucose residue and, on average, there is one glycerate per repeat unit and one acetate per every two repeat units. In the low acyl [LA] form, the acyl groups have been removed to produce a linear repeat unit substantially lacking such groups. Light scattering and intrinsic viscosity measurements indicate a molecular mass of approximately $5 \times 10^5$ daltons for [LA] gum [Grasdalen, H. et al., Carbohydrate Polymers, 7, [1987], 371]. X-ray diffraction analysis shows that gellan gum exists as a three-fold, left-handed, parallel double helix [Chandreskaran et al., Carbohydrate Res., 175, [1988], 1 181, [1988]23].

Low acyl [LA] gellan gums form gels when cooled in the presence of gel-promoting cations, preferably divalent cations, such as calcium and magnesium. The gels formed are firm and brittle. High acyl [HA] gellan gums do not require the presence of cations for gel formation and the gels formed have structural and Theological characteristics which are significantly affected by the acyl substituents. Thus the properties of [HA] gellan gels differ significantly from those of [LA] gellan gels. [HA] gels are typically soft and flexible and lack thermal hysteresis.

Typical gelation temperatures for [LA] gellan gums are in the range 30° C. to 50° C., depending upon the nature and concentration of the cations present. Typical gelation temperatures for [HA] gellan gums are in the region of 70° C. The high gelation temperature of [HA] gellan gum can be advantageous in some applications such as fruit fillings where it can prevent flotation of the fruit. In other applications, however, such as ready-to-eat jellies and confectionery, the high gelation temperature can be a problem with regard to pre-gelation prior to depositing.

A wide range of gel textures can be produced through manipulation of blends of [HA] and [LA] gellan gum. However, it has been demonstrated that mixtures of [HA] and [LA] forms exhibit two separate conformational transitions at temperatures coincident with the individual components [Morris, E. R., et al., Carbohydrate Polymers, 30, [1996], 165–175]. No evidence for the formation of double helices having both [HA] and [LA] molecules has been found. This means that problems associated with the high gelation temperature of [HA] gellan gum still exist in blended systems.

It has been demonstrated that treatment conditions using strong bases such as potassium hydroxide during recovery influence both the composition and rheological properties of gellan gum [Baird, J. K., Talashek, T. A., and Chang, H., Proc. 6th International Conference on Gums and Stabilisers for the Food Industry, Wrexham, Clwyd, Wales. July 1991—Edited Phillips G. O., et al, published by IRL Press at OUP [1992], 479–487]. This suggests that control of acyl content by strong base treatment during the gum recovery process can lead to a diversity of textures. To date, however, this observation has not led to such control being realised on a commercial scale. Consequently, gellan gum remains available essentially in two forms only, i.e. [HA] and [LA].

Gellan gums have a wide variety of applications in food and non-food manufacture and the provision of a range of forms in addition to the basic [HA] and [LA] forms, i.e. a range of intermediate forms, other than blends, is desirable. Such new forms of gellan gums are potentially useful in the current search for suitable alternatives to gelatin.

BRIEF SUMMARY OF THE INVENTION

According to the present invention there is provided a gellan gum composition which comprises a structure having linear tetrasaccharide repeat units of glucose residues to some of which residues are attached acetate and/or glycerate substituent groups wherein the ratio of acetate substituent groups to glycerate substituent groups is at least 1.

It should be noticed that the Baird at al. reference mentioned hereabove does not disclose gellan gum compositions that show acetate/glycerate ratios higher than 1.

Preferably, the ratio of acetate substituant to glycerate substituent is higher than 1.1.

According to the present invention, there is further provided a process for the modification of a gellan gum to alter the acyl content thereof which comprises a step wherein the gum is treated with a weak base, in an amount and under such conditions that the gel-forming properties and rheological behaviour of the gum are modified to an appreciable extent.

When processed by appropriate weak base treatment, the gellan gum composition may comprise a structure having linear tetrasaccharide repeat units of glucose residues to some of which residues are attached acetate and/or glycerate substituent groups wherein the total of attached acetate and glycerate substituent groups per linear tetrasaccharide repeat unit is at least 1 and the ratio of acetate substituents to glycerate substituents is at least 1.1 or, wherein the total acyl substituent groups per linear repeat unit is greater than 0.4 and less than 1 and the ratio of acetate substituent groups to glycerate substituent groups is at least 2.

Further, according to the present invention we provide a process for the production of a gellan gum-containing product which comprises the steps of:

a) modifying the gellan gum to alter the acyl content thereof by treating the gum with a weak base in an amount and under such conditions that the gel-forming properties and rheological behavior of the gum are modified to an appreciable extent; and later b) causing the modified gum to gel during formation of the gellan gum-containing product.

Although, the prior art does not disclose gellan gum compositions as herein, a strong base treatment of native gellan gum is already known and can, under certain circumstances yield modified gellan gum as per this present invention.

DETAILED DESCRIPTION OF THE INVENTION

A weak base is a term generally in use for a base which is not fully dissociated in solution. The term is defined in "The Usborne Illustrated Dictionary of Chemistry", edited by Tony Potter and Corrine Stockley, ISBN 0 86020821 4 published by Usborne Publishing Co. at page 38 [1986] as "a base that is only partially ionised in water. Only some of the molecules of the base split up to produce hydroxyl ions, giving a weakly alkaline solution." A weak base dissociates in stages effectively metering out its alkalinity with time.

The weak base treatment used in the modification process of the invention is suitably carried out using any weak base. Specific bases which can be used include phosphates, for example tetra sodium pyrophosphate [TSPP], tetra potassium pyrophosphate [TPPP], Potassium tripolyphosphate [PTPP], Sodium tripolyphosphate [STPP], trisodium phosphate [TSP] and tripotassium phosphate [TPP]; base metal carbonates such as sodium carbonate and potassium carbonate and base metal bicarbonates such as sodium bicarbonate and potassium bicarbonate. Mixtures of weak bases may be used and weak bases can also be used in conjunction with strong bases such as sodium and potassium hydroxides. In use in conjunction with the weak bases, strong bases are suitably present in appropriate amounts depending upon the nature of the modification process. When carbonates and bicarbonates are used as weak bases they add little to the ash content of the final product, a desirable property in some circumstances.

The use of weak base treatment in the modification process enables the total acyl content of the gum to be controlled. The treatment also alters the relation between the proportion of acetate to glycerate substituents attached to the linear tetrasaccharide spine of the gum since the weak base treatment leads to a preferential liberation of the glycerate groups during the gradual reduction of the acyl content of the gum. The weak base treatment leads to a reduction in the acyl content of the gum, i.e. of both acetate and glycerate groups, but in doing so, it increases the proportion of acetate groups. The treatment can produce a partial reduction of glycerate groups or a total removal of these groups while leaving a proportion of acetate groups present in the gum. The modification process of the invention can enable a range of gums to be produced, i.e. there is the prospect of "tailor made" gums being produced having properties varying between those of [HA] and [LA] gums. Preferred treatments produce gums containing enhanced proportions of acetate, groups due to the selective removal of glycerate groups. Treatment of gums with strong bases causes some reduction in the acyl content and some increase in the ratio of acetyl to glyceryl substituent groups therein. However, this effect by strong bases is significantly less than is the case with weak bases. The enhanced effect on acyl content produced by weak bases has important consequences for the properties of the gums in terms of Theological properties and setting temperatures.

The modification process of the invention can be performed during the production of the gellan gum or during the processing of food or non-food applications. Treatment can be applied to a fermentation broth or to a rehydrated gellan gum solution. The preferred concentration of weak base for treatment will depend upon the desired nature of the final product. During treatment there is generally a reduction in pH to and this reduces the need for an acid neutralisation step which is often used during the modification of gellan gum with strong base.

The main parameters which affect the modification process of the invention include the molarity of the weak base, the temperature and the duration of the treatment. In the main, these parameters have the same general impact upon the process whichever weak base is used. Generally, temperature and duration of treatment have less effect on the process at low base concentrations than at high base concentrations. For satisfactory operation of the modification process, the values for the individual parameters are suitably adjusted depending upon the result desired. However, suitable ranges for these parameters include temperatures above 80° C. and preferably in the range 90° C. to 95° C.; durations up to 30 minutes, preferably 5 to 20 minutes and especially 5 to 10 minutes.

Suitable molarities of the weak base depend upon the nature of the desired product and upon whether a fermentation broth or a rehydrated gum solution is to be treated. For treatment of a fermentation broth suitable molarity ranges to give.

[a] a fully deacylated product are 20–40 mM,

[b] a partially deacylated, soft elastic product with a low setting temperature are 2–10 mM,

[c] a product of intermediate texture [see Baird et al, Wrexham Conference Paper] are 10–20 mM The corresponding molarity ranges for treatment of a rehydrated gum solution are 8–12 mM; 2–3 mM; and 4–8 mM respectively.

The effects of weak base concentration, temperature and treatment duration all indicate that the modification process results in a gradual change in the texture of the gellan gum gels produced. As the intensity of treatment increases, the texture of the gels alters from soft and elastic [low modulus, high yield strain] to firm and brittle [high modulus, low yield strain]. This corresponds to a gradual increase in deacylation of the gum with increasing intensity of treatment.

In some instances it is useful to include metal ions, particularly divalent ions such as calcium ions, in the reaction mixtures used in the gel formation step [b] of the gellan gum-containing product production process. Moreover, in some instances gums containing acetate groups and few, if any, glycerate groups show a decreased tendency to syneresis—to exude water—than other gums. If required a neutralisation step, e.g. with citric acid, may be included during the modification process.

The modification process of the invention may be applied to [HA] gellan gums generally. Such gums are typically produced as extracellular products of the aerobic fermentation of bacteria of the specifies *Sphingomonas Elodea*, particularly strain ATCC 31461 in aqueous media containing suitable sources of carbon, phosphate, organic and inorganic nitrogen and trace elements under sterile conditions and under suitable controls of aeration, agitation, temperature and pH. Suitable fermentation regimes are described by Kang et al [Appl. Environ. Microbiol., 43, [1982], 1086]. When fermentation has been completed the produced viscous broth is pasteurised to kill viable cells before the gum is recovered, e.g. by alcohol precipitation. A very suitable [HA] gum is "KELCOGEL" [Registered Trade Mark] LT100, produced by the NutraSweet Kelco Company of San Diego Calif., USA.

The invention provides a process which enables a wide range of modified gellan gums to be produced including the novel gellan gum composition specifically claimed herein. These gellan gums have a wide range of food and non-food applications.

Typical food applications include: confectionery; jams and jellies; fabricated foods; water-based gels; pie fillings and puddings; icings, frostings and glazes; dairy products; beverages; films/coatings; pet foods.

Typical non-food applications include: microbiological media; room deodorant gels; capsules and photographic film; films and fibres; personal care products; dental products.

The advantages of partial deacylation of gellan gum by treatment using the modification process include:

a] Lowered gelation temperature
   A reduced gelation temperature provides longer open [ungelled] time for the manufacturer and makes the product easier to work with.
b] Reduced melting temperature
   Melting temperatures can be reduced to close to those of gelatin (~30° C.).
c] Modified gel characteristics
   Compared to HA gellan gum, these are reduced elasticity and increased firmness. They provide improved organoleptic properties compared to fully acylated gellan gum gels. Compared to LA gellan gum, these are less brittle and reduced firmness. Gels can be prepared with a range of textures from those that mimic gelatin to textures similar to k-carrageenan.
d] Simple preparation procedure
   The modification process can be easily performed as part of a make-up procedure particularly in products such as ready-to-eat jellies, UHT dairy products, confectionery and concentrated jelly blocks, or as a treatment of a fermentation broth.
e] Single gelation temperature
   Although a range of textures can be produced through blending of [HA] and [LA] gums, these systems have been shown to exhibit two gelation points associated with the individual components of the blend. These blends have also been known to synerise. The partially deacylated gellan gum gels produced using the modification process exhibit a single gelation temperature and no syneresis.

The invention is illustrated by the following examples:

EXAMPLE 1

Deacylation of Gellan Gum: Phosphates as Weak Bases

The following method demonstrates how [HA] gellan gum can be deacylated to varying degrees by treatment of the gum with weak bases. [HA] gellan gum, "KELCOGEL" LT100 [0.5%] was dispersed at room temperature in standard tap water [STW] in which had previously been dissolved various amounts of a weak base. Using the CarriMed controlled stress rheometer the dispersion was heated, while mixing, from 20° C. to 90° C. at a rate of 2° C./min then cooled from 90° C. to 20° C. at 2° C./min. During cooling the gel temperature was measured using dynamic oscillation. A second portion of the dispersion was heated to 90° C. on a hot plate. Citric acid was added to the hot solution at twice the addition level of the weak base to neutralise the solution. Samples were cast for Texture Profile Analysis [TPA] after evaporative losses had been made good with STW. TPA was performed after overnight storage at 5° C. Gels were compressed to 85% strain. Texture Profile Analysis involves the compression of a free standing gel twice in succession [Bourne, M. C. [1978], "Texture Profile Analysis"; Food Technology, 32, 67–72].

Results

The gelation temperature and texture of the gels are dependent on the type and concentration of phosphate used. This is a function of the relative strength of each of the phosphates as a weak base [Table I]. The results are summarised in Tables II to IV.

TABLE I

| pH of phosphates [1%] solution | |
|---|---|
| Phosphate | pH |
| Tetra sodium pyrophosphate | 10.2 |
| Tetra potassium pyrophosphate | 10.2 |
| Potassium tri polyphosphate | 9.8 |
| Sodium tri polyphosphate | 9.8 |
| Tri sodium phosphate | 11.8 |
| Tri potassium phosphate | 11.9 |

TABLE II

Effect of tri sodium phosphate on the texture and gelation temperature of 0.5% [HA] gellan gum gels

| Tri sodium phosphate [mM] | Modulus [Ncm-2] | Hardness [Kfg] | Brittleness [%] | Gelation Temperature [° C.] |
|---|---|---|---|---|
| 0.00 | 0.398 | 6.66 | 79.2 | 72 |
| 1.52 | 0.358 | 5.50 | 79.8 | 61 |
| 3.05 | 0.351 | 2.76 | 79 | 51 |
| 6.10 | 1.160 | 2.77 | 53.5 | 34 |
| 9.15 | 3.310 | 4.12 | 42.3 | 38 |
| 12.20 | 3.85 | 4.14 | 41.1 | 40 |
| 15.20 | 5.20 | 3.60 | 35.7 | 38 |

TABLE III

Effect of tetra sodium pyrophosphate on the texture and gelation temperature of 0.50% [HA] gellan gum gels

| tetra sodium pyrophosphate [mM] | Modulus [Ncm$^{-2}$] | Hardness [Kgf] | Brittleness [%] | Gelation Temperature [° C.] |
|---|---|---|---|---|
| 0.00 | 0.398 | 6.66 | 79.2 | 72 |
| 1.88 | 0.319 | 6.67 | 79.2 | 60 |
| 3.76 | 0.330 | 3.80 | 75.3 | 45 |
| 5.64 | 0.756 | 1.66 | 53.8 | 37 |
| 7.52 | 4.02 | 3.21 | 37.8 | 33 |

TABLE IV

Effects of sodium tri polyphosphate on the texture and gelation temperature of 0.5% [HA] gellan gum gels

| sodium tri polyphosphate [mM] | Modulus [Ncm$^{-2}$] | Hardness [Kgf] | Brittleness [%] | Gelation Temperature [° C] |
|---|---|---|---|---|
| 0.00 | 0.398 | 6.66 | 79.2 | 72 |
| 1.36 | 0.319 | 7.17 | 77.8 | 66 |
| 2.72 | 0.335 | 5.69 | 79.7 | 57 |
| 4.08 | 0.467 | 1.29 | 73.5 | 46 |
| 5.44 | 0.550 | 0.87 | 54.8 | 36 |

The results show that in each case use of increasing amounts of weak base initially produced marked reductions in the gelation temperature. However, it can be seen from Table II that the gelation temperature remained essentially unchanged for increases in base concentration beyond 6.1 mM. The use of weak base also affected the gel properties of modulus, hardness and brittleness as shown in Tables II to IV

EXAMPLE 2

Preparation of Ready-to-Eat Jelly

| Ingredients | [%] |
|---|---|
| Sucrose | 12.0 |
| "KELCOGEL" LT 100 | 0.40 |
| tri sodium phosphate | 0.025 to 0.10 (~1 to 4 mM) |
| citric acid | 0.05 to 0.20 |
| colour and flavour | to suit |
| water | to 100 |

Preparation

1. Blend the "KELCOGEL" LT100, sucrose and tri sodium phosphate, disperse in the cold water and heat to 90° C.
2. Add the citric acid, colour and flavour pre-dissolved in a small volume of water to the hot gum solution.
3. Fill and allow to cool undisturbed.

TABLE V

Effect of tri sodium phosphate on the texture and gelation temperature of 0.4% [HA] gellan gum RTE jelly

| tri sodium phosphate [%] | Modulus [Ncm$^{-2}$] | Hardness [Kfg] | Brittleness [%] | Gelation Temperature [° C.] |
|---|---|---|---|---|
| 0.00 | 0.312 | 3.688 | 78.4 | 63 |
| 0.025 | 0.349 | 3.068 | 78.7 | 62 |
| 0.050 | 0.303 | 2.827 | 80.4 | 45 |
| 0.100 | 0.544 | 1.029 | 60.8 | 31 |

EXAMPLE 3

Preparation of Gum Confectionery

Hydration of the gellan gum in alkaline conditions reduces the hot viscosity and tendency of the liquor to pre-gel enabling the confection to be more easily deposited.

| Ingredients | Weight [g] |
|---|---|
| Part 1 | |
| Sucrose | 149.0 |
| Corn syrup [43DE] | 159.0 |
| "KELCOGEL" F | 3.75 |
| "KELCOGEL" LT100 | 1.00 |
| tri sodium phosphate | 0.12 to 0.24 |
| tri sodium citrate di-hydrate | 1.00 |
| di-calcium phosphate di-hydrate | 0.13 |
| Water | 120.0 |
| Part 2 | |
| Malic acid | 4.0 |
| sodium citrate | 1.70 |
| colour and flavour | to suit |
| Water | 20.0 |

Preparation

Part 1

1. Blend the gellan gum and tri sodium phosphate with 20 g of the sucrose, disperse in the cold water and heat to boiling.
2. Add the pre-warmed corn syrup to the hot gum solution
3. Blend the di-calcium phosphate di-hydrate and sodium citrate with the remainder of the dry sucrose and add to the hot liquor maintaining the boil.
4. Boil to approximately 72% TSS
5. Pre dissolve the acid, sodium citrate colour and flavour in the water of part 2 and add to Part 1
6. Immediately deposit in starch moulds and stove at 40 to 45° C. for up to 72 h.

The final total soluble solid content is approximately 80% with a pH of 3.75.

*DE=Dextrose Equivalent "KELCOGEL" F is a [LA] clarified gellan gum produced in the same manner as "KELCOGEL" LT100 but with the added steps of deacylation and clarification between fermentation and alcohol precipitation.

EXAMPLE 4

Comparison of Weak and Strong Base Treatment

Reconstituted high acyl gellan gum samples were treated with KOH, NaOH, $K_2CO_3$, $Na_2CO_3$ and tri sodium phosphate {TSP} at the same molar concentrations and the effects on degree of acylation and rheological properties were compared.

Experimental

The high acyl gellan gum (0.5% w/w) was dispersed in standard tap water into which had previously been dissolved the appropriate concentration of base. The dispersion was heated to 90° C. with constant stirring and then immediately neutralised by the addition of citric acid at twice the w/w concentration of the added base. The gum was then precipitated from solution by the addition of 3 volumes of propane-2-ol and recovered by filtration through a 540 Whatman filter paper. The filtrate was dried overnight at 55° C.

Rheological characterisation of the base treated, alcohol precipitated samples

Samples were prepared by dispersing the material in deionised water and heating to 90° C. with mixing. Once fully hydrated the appropriate volume of 0.05M $CaCl_2.6H_2O$ was added to give the appropriate concentration of calcium in the final gel. Evaporative losses were made good by the addition of deionised water Samples were cast for compression testing in cylindrical moulds of 14 mm height and 29 mm internal diameter. Gels were removed from the moulds after a minimum of 18 h storage at 5° C. and compressed at 0.85 $mms^{-1}$ to 15% of their original height (85% strain) twice in succession using an Instron 4301 Universal Testing Machine fitted with a 63 mm diameter compression plate. Modulus, hardness, brittleness and elasticity were measured.

The setting behaviour of the gels was followed by dynamic oscillation using a CarriMed $CSL^2$ controlled stress rheometer fitted with a 6 cm flat plate and a gap of 0.5 mm.

The sample was loaded onto the plate of the rheometer whilst hot (90° C.) and evaporation was minimised by covering the exposed surfaces with a silicone oil (BDH DC200/200). The sample was cooled from 90° C. to 20° C. at 2° C. $min^{-1}$, 1% strain and a frequency of 10 $rad.s^{-1}$. This was followed by immediate re-heating under the same conditions.

The results are set out in Tables VI and VII

TABLE VI

Effect of base treatment on the degree of acylation of gellan gum.

| Base | Concentration (mM) | Total substituents (per repeat) | Glycerate (per repeat) | Acetate (per repeat) | Acetate/ Glycerate ratio |
|---|---|---|---|---|---|
| Control | 0 | 1.51 | 0.88 | 0.63 | 0.72 |
| KOH | 1 | 1.40 | 0.80 | 0.60 | 0.75 |
|  | 2 | 1.22 | 0.64 | 0.58 | 0.91 |
|  | 3 | 1.00 | 0.49 | 0.51 | 1.04 |
|  | 4 | 0.84 | 0.39 | 0.45 | 1.15 |
|  | 5 | 0.63 | 0.25 | 0.38 | 1.52 |
|  | 6 | 0.43 | 0.15 | 0.28 | 1.87 |
|  | 8 | 0.18 | 0.03 | 0.15 | 5.00 |
|  | 10 | 0.05 | 0.02 | 0.03 | 1.50 |
| NaOH | 2 | 1.15 | 0.60 | 0.55 | 0.91 |
|  | 4 | 0.70 | 0.30 | 0.40 | 1.33 |
| $Na_2CO_3$ | 2 | 1.00 | 0.45 | 0.55 | 1.22 |
|  | 4 | 0.60 | 0.16 | 0.44 | 2.75 |
| $K_2CO_3$ | 2 | 1.06 | 0.50 | 0.56 | 1.12 |
|  | 4 | 0.67 | 0.20 | 047 | 2.35 |
| TSP | 1.52 | 1.32 | 0.72 | 0.60 | 0.83 |
|  | 3.05 | 0.89 | 0.37 | 0.52 | 1.41 |

TABLE VII

Rheological properties of 0.5% gels in 2 mM Calcium.

| Base | (mM) | Total substituents (per/repeat) | A/G ratio | Set temp (° C.) | M ($Ncm^{-2}$) | H (Kgf) | B (%) | E (%) |
|---|---|---|---|---|---|---|---|---|
| Control | 0 | 1.51 | 0.72 | 69 | 0.383 | 3.96 | 81.0 | 43.5 |
| KOH | 1 | 1.40 | 0.75 | 64 | 0.361 | 2.87 | 76.7 | 48.4 |
|  | 2 | 1.22 | 0.91 | 59 | 0.332 | 2.64 | 81.3 | 49.0 |
|  | 3 | 1.00 | 1.04 | 51 | 0.406 | 1.87 | 78.2 | 28.3 |
|  | 4 | 0.84 | 1.15 | 34 | 0.454 | 1.91 | 70.7 | 25.6 |
|  | 5 | 0.63 | 1.52 | 30 | 0.733 | 1.96 | 57.6 | 26.0 |
|  | 6 | 0.43 | 1.87 | 28 | 1.13 | 1.58 | 47.4 | 26.3 |
|  | 8 | 0.18 | 5.00 | 29 | 3.55 | 3.22 | 40.6 | 25.4 |
|  | 10 | 0.05 | 1.50 | 31 | 4.14 | 4.34 | 41.3 | 22.9 |
| NaOH | 2 | 1.15 | 0.91 | 60 | 0.342 | 2.63 | 76.4 | 44.7 |
|  | 4 | 0.70 | 1.33 | 32 | 0.557 | 2.27 | 66.8 | 26.8 |
| $Na_2CO_3$ | 2 | 1.00 | 1.22 | 40 | 0.460 | 1.99 | 69.7 | 24.9 |
|  | 4 | 0.60 | 2.75 | 31 | 1.59 | 3.08 | 50.9 | 22.7 |
| $K_2CO_3$ | 2 | 1.06 | 1.12 | 42 | 0.431 | 2.38 | 76.8 | 30.8 |
|  | 4 | 0.67 | 2.35 | 33 | 1.78 | 2.32 | 45.3 | 24.2 |
| TSP | 1.52 | 1.32 | 0.83 | 54 | 0.354 | 1.76 | 71.5 | 34.6 |
|  | 3.05 | 0.89 | 1.41 | 38 | 0.451 | 1.88 | 70.6 | 25.1 |

M = Modulus, H = Hardness, B = Brittleness, E = Elasticity

Tables VI and VII provide a comparison of the effects of treatment with strong and weak bases on the degree of acylation and rheological properties of gellan gum respectively. There are significant differences in their effect on the total acyl content and acetate/glycerate [A/G] ratio. Weak base is more effective at removing glycerate substituents than strong base. As a result gellan gum products with higher A/G ratios can be prepared. This leads to unique properties in the gellan gum products produced through weak base treatment.

A more detailed comparison is provided in Tables VIII and IX. At low treatment levels, both strong and weak base treatment raise the A/G ratio (~0.91 and ~1.15 respectively) the greater effect seen with the weak base results in a lower setting temperature. For example, samples treated with 2mM hydroxide set at ~60° C. whereas samples treated with 2mM carbonate set at ~41° C. compared to a setting temperature of ~70° C. in the untreated control. Both samples maintain the soft, elastic textural characteristics of the untreated control. Comparison to the sample treated with 3 mM KOH which has a similar total acyl content (1.00) but lower A/G ratio (1.04) shows that the lower A/G ratio results in a gel with a higher setting temperature (51° C.) compared to the weak base treated samples.

TABLE VIII

Comparison of the effects of strong and weak base treatment on the acyl substitution of gellan gum.

| Base | (mM) | Total substituents (per/repeat) | Glycerate (per/repeat) | Acetate (per/repeat) | Acetate/ Glycerate ratio |
|---|---|---|---|---|---|
| Control | 0 | 1.51 | 0.88 | 0.63 | 0.72 |
| KOH | 2 | 1.22 | 0.64 | 0.58 | 0.91 |
| NaOH | 2 | 1.15 | 0.60 | 0.55 | 0.92 |
| Na$_2$CO$_3$ | 2 | 1.00 | 0.45 | 0.55 | 1.22 |
| K$_2$CO$_3$ | 2 | 1.06 | 0.50 | 0.56 | 1.12 |
| KOH | 3 | 1.00 | 0.49 | 0.51 | 1.04 |
| KOH | 4 | 0.84 | 0.39 | 0.45 | 1.15 |
| NaOH | 4 | 0.70 | 0.30 | 0.40 | 1.33 |
| Na$_2$CO$_3$ | 4 | 0.60 | 0.16 | 0.44 | 2.75 |
| K$_2$CO$_3$ | 4 | 0.67 | 0.20 | 0.47 | 2.35 |
| KOH | 5 | 0.63 | 0.25 | 0.38 | 1.52 |
| KELCOGEL LT | | ~0 | | | |
| KOH | 10 | 0.05 | 0.02 | 0.03 | 1.50 |
| TSP | 12.2 | 0.01 | 0.00 | 0.01 | — |
| Na$_2$CO$_3$ | 30 | 0.12 | 0.04 | 0.08 | 2.00 |

TABLE IX

Comparison of the effect of strong and weak base treatment on the rheological properties of 0.5% w/w gellan gum gels.

| Base | (mM) | Calcium (mM) | Total substituents (per repeat) | A/G ratio | Set temp (° C.) | M (Ncm$^{-2}$) | H (Kgf) | B (%) |
|---|---|---|---|---|---|---|---|---|
| Control | 0 | 2 | 1.51 | 0.72 | 69 | 0.38 | 3.96 | 81.0 |
| KOH | 2 | 2 | 1.22 | 0.91 | 59 | 0.33 | 2.64 | 81.3 |
| NaOH | 2 | 2 | 1.15 | 0.92 | 60 | 0.34 | 2.63 | 76.4 |
| Na$_2$CO$_3$ | 2 | 2 | 1.00 | 1.22 | 40 | 0.46 | 1.99 | 69.7 |
| K$_2$CO$_3$ | 2 | 2 | 1.06 | 1.12 | 42 | 0.43 | 2.38 | 76.8 |
| KOH | 3 | 2 | 1.00 | 1.04 | 51 | 0.41 | 1.87 | 78.2 |
| KOH | 4 | 2 | 0.84 | 1.15 | 34 | 0.45 | 1.91 | 70.7 |
| NaOH | 4 | 2 | 0.70 | 1.33 | 32 | 0.56 | 2.27 | 66.8 |
| Na$_2$CO$_3$ | 4 | 2 | 0.60 | 2.75 | 31 | 1.59 | 3.08 | 50.9 |
| K$_2$CO$_3$ | 4 | 2 | 0.67 | 2.35 | 33 | 1.78 | 2.32 | 45.3 |
| KOH | 5 | 2 | 0.63 | 1.52 | 30 | 0.73 | 1.96 | 57.6 |
| KGL LT | | 10 | ~0.00 | N/A | ~40 | 8.19 | 2.45 | 30.7 |
| KOH | 10 | 10 | 0.05 | N/A | 44 | 7.24 | 2.83 | 32.0 |
| TSP | 12.2 | 10 | 0.01 | N/A | 45 | 6.26 | 2.49 | 33.5 |
| Na$_2$CO$_3$* | 30 | 10 | 0.12 | N/A | ~36 | 4.96 | 3.34 | 38.5 |

M = Modulus, H = Hardness, B = Brittleness A/G = acetate/glycerate ratio
*treated broth At intermediate levels of base again the weak base is more effective at removing the glycerate. This results in samples with increased modulus and intermediate brittleness. The Importance of the A/G ratio can be illustrated by comparison to the 5 mM KOH treated sample which has a similar total acyl content (0.63) but lower A/G ratio (1.52). The texture of this sample is softer and more elastic (lower modulus, higher brittleness)

Deacylation with weak base results in a product that produces softer, more elastic gels (lower modulus, higher brittleness) than material fully deacylated with strong base. Low levels of residual acetate may account for these differences.

The results of these experiments lead to the following conclusions:

Conclusions

1. Weak base carbonates, phosphates are more effective at removing the glycerate substituents than strong bases [hydroxides]
2. Weak base treatment is more effective at reducing setting temperature. For example, samples treated with 2 mM hydroxide set at ~60° C. whereas samples treated with 2 mM carbonate set at ~41° C. compared to a setting temperature of ~70° C. in the untreated control.
3. Deacylation with weak base results in a product that produces softer, more elastic gels [lower modulus, higher brittleness] than material fully deacylated with strong base due to the presence of low levels of acetate residues.

EXAMPLE 5

The following method demonstrates how untreated native gellan gum broth can be deacylated to varying degrees by treatment with weak bases. The concentration and type of weak base used are listed in Table X.

15 kg of broth were heated to 94° C. using a 40 litre scrape surface steam jacketed kettle. 1 litre of the appropriate concentration of weak base was then added and mixed for 10 minutes. The gellan gum was recovered by precipitation with 3 volumes of constant boiling isopropyl alcohol (88% IPA/12% water) and collected on a 20 mesh screen. The wet material was pressed to approximately 40% solids through muslin cloth. The remaining IPA was removed by drying at 40° C. in a convection oven for 12 hours. Finally the fibre was milled using a Wiley knife mill.

The effect of sucrose [0 to 60% w/w] and added calcium [0 to 14 mM] on the set temperature and texture profile analysis of 0.5% w/w gels prepared from the modified gellan gum are compared to an untreated control and to KELCOGEL LT and KELCOGEL F.

"KELCOGEL" LT is a fully deacylated, unclarified [LA] gum

Figure 1:
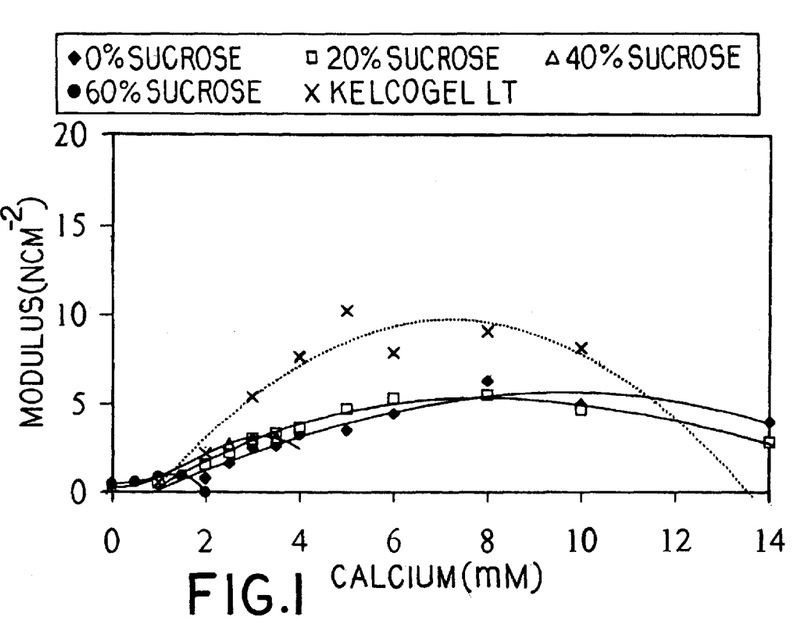
FIG. 1 is a graph showing the effect of calcium on modulus of 0.5% gellan gum gels.
Figure 2:
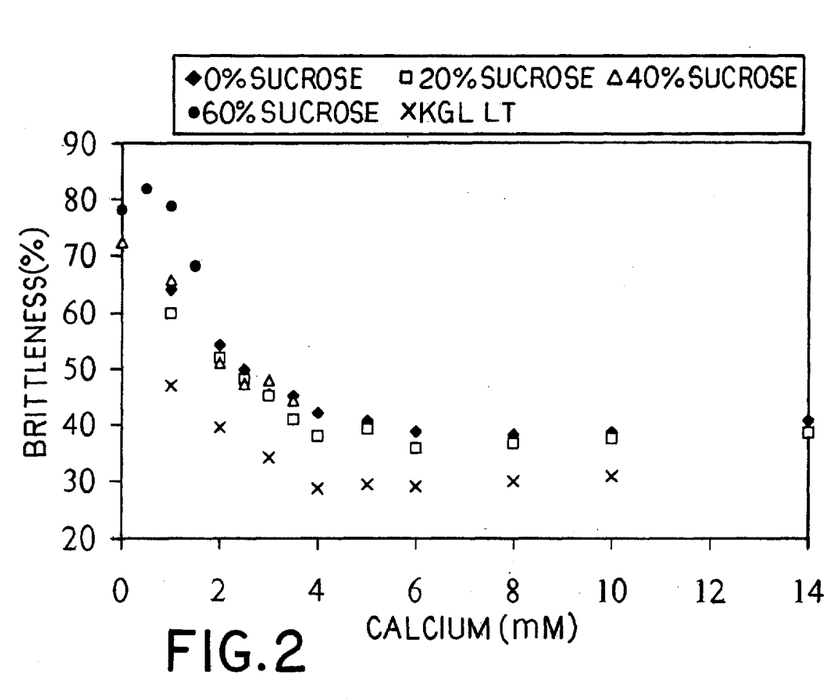
FIG. 2 is a graph showing the effect of calcium on brittleness of 0.5% gellan gum gels.
Figure 3:
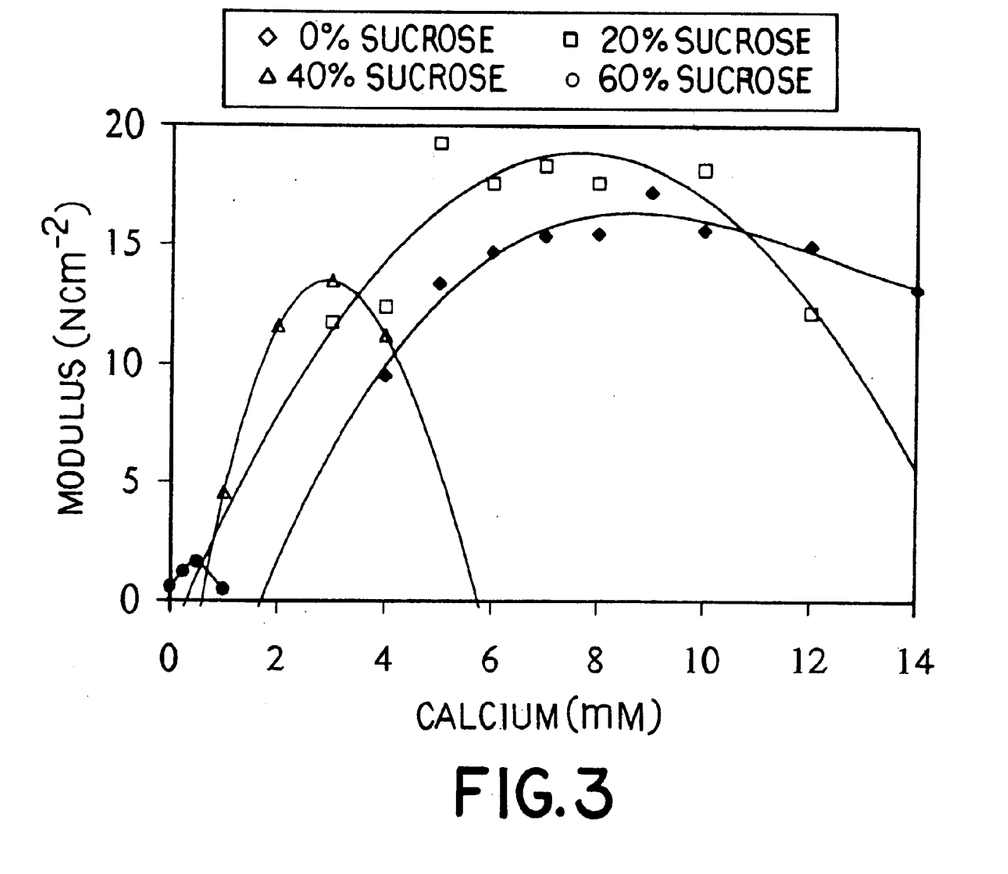
FIG. 3 is a graph showing the effect of calcium on modulus of 0.5% gellan gum gels prepared from fully deacylated gellan gum.

This example is illustrated by FIGS. 1 to 3 which are as follows:

FIG. 1: Is a plot of Modulus [Ncm$^{-2}$] against calcium concentration [mM] to show the effect of calcium on modulus for 0.5% w/w gels prepared from gellan gum broth treated with 30 mM Na$_2$CO$_3$ compared to "KELCOGEL" LT.

FIG. 2: Is a plot of Brittleness % against calcium concentration [mM] to show the effect of calcium on the brittleness of 0.5% gels prepared from gellan gum broth treated with 30 mM Na$_2$CO$_3$ compared to "KELCOGEL" LT.

FIG. 3: Is a plot of Modulus [Ncm$^{-2}$] against calcium concentration [mM] to show the effect of calcium on the modulus of 0.5% w/w "KELCOGEL" F.

Experimental

Materials: The gellan gum samples evaluated are set out in Table X:

TABLE X

| Samples | Glycerate (per repeat) | Acetate (per repeat) | Total (per repeat) | Acetate/ Glycerate ratio |
|---|---|---|---|---|
| Control | 0.76 | 0.47 | 1.23 | 0.61 |
| 5 mM TSP | 0.47 | 0.41 | 0.88 | 0.87 |
| 5 mM Na$_2$CO$_3$ | 0.56 | 0.45 | 1.01 | 0.80 |
| 12.5 mM TSP | 0.26 | 0.37 | 0.63 | 1.42 |
| 12.5 mM Na$_2$CO$_3$ | 0.22 | 0.36 | 0.58 | 1.63 |
| 30 mM Na$_2$CO$_3$ | 0.04 | 0.08 | 0.12 | 2.00 |

Samples were prepared by dispersing the material (0.5% w/w) in deionised water and heating to 90° C. with mixing. Once fully hydrated the appropriate volume of 0.1M CaCl$_2$.6H$_2$O was added followed by the sucrose. Evaporative losses were made good by the addition of deionised water. Gels of varying pH were prepared by adding 0.1% sodium citrate and citric acid (0 to 0.09%) to the hot gum solutions.

Samples were cast for compression testing in cylindrical moulds of 14 mm height and 29 mm internal diameter. Gels were removed from the moulds after a minimum of 18 h storage at 5° C. and compressed at 0.85 mms$^{-1}$ to 15% of their original height (85% strain) twice in succession using an Instron 4301 Universal Testing Machine fitted with a 63 mm diameter compression plate. Modulus, hardness, brittleness and elasticity were measured.

The setting behaviour of the gels was followed by dynamic oscillation using a CarriMed CSL$^2$ controlled stress rheometer fitted with a 6 cm flat plate and a gap of 0.5 mm. The sample was loaded onto the plate of the rheometer whilst hot (90° C.) and evaporation was minimised by covering the exposed surfaces with a silicone oil (BDH DC200/200). The sample was cooled from 90° C. to 20° C. at 2° C. min$^{-1}$, 1% strain and a frequency of 10 rad.s$^{-1}$. This was followed by immediate re-heating under the same conditions.

The results are described below.

Results

Effect of Sucrose

The effect of sucrose addition on the rheological properties of the prototypes is summarised in Tables XI and XII. Gels were prepared at 0.5% w/w gum concentration in deionised water with no added calcium. The setting temperature and hardness of the gels were lower in all the treated samples compared to the untreated control. Generally, the addition of sucrose increased the setting temperature and the hardness of the gels. Interestingly, addition of 1 mM calcium to the untreated control in 60% sucrose resulted in a complete loss of gelation. It is generally recognised that low acyl gellan gum's tolerance to calcium is greatly reduced by the addition of sugars and this result would suggest that the same is true for the high acyl and partially acylated forms.

TABLE XI

Effect of sucrose on the properties of gels prepared from gellan gum prototypes
[0.5% w/w gum in deionised water, no added calcium]

| | Control | | | | 5 mM TSP | | | | 5 mM Na2CO3 | | | |
|---|---|---|---|---|---|---|---|---|---|---|---|---|
| Sucrose | Set temp [° C.] | Modulus [Ncm$^{-2}$] | Hardness [Kgf] | Brittleness [%] | Set temp [° C.] | Modulus [Ncm$^{-2}$] | Hardness [Kgf] | Brittleness [%] | Set temp [° C.] | Modulus [Ncm$^{-2}$] | Hardness [Kgf] | Brittleness [%] |
| 0 | 53 | 0.354 | 1.69 | 77.2 | 33 | 0.312 | 1.02 | 78.4 | 38 | 0.334 | 0.953 | 75.9 |
| 20 | 62 | 0.389 | 2.54 | 77.1 | 39 | 0.328 | 1.07 | 77 | 46 | 0.354 | 1.3 | 67.8 |
| 40 | 64 | 0.38 | 3.4 | 78.3 | 50 | 0.363 | 2.58 | 76.8 | 51 | 0.374 | 2.64 | 76.6 |
| 60 | 75 | 0.412 | 7.1 | 79.3 | 55 | 0.353 | 3.82 | 81.7 | 61 | 0.347 | 3.38 | 80.7 |

TABLE XII

Effect of sucrose on the properties of gels prepared from gellan gum prototypes
[0.5% w/w gum in deionised water, no added calcium]

| Sucrose | 12.5 mM TSP | | | | 12.5 mM Na2CO3 | | | | 30 mM Na2CO3 | | | |
|---|---|---|---|---|---|---|---|---|---|---|---|---|
| | Set temp [° C.] | Modulus [Ncm$^{-2}$] | Hardness [Kgf] | Brittleness [%] | Set temp [° C.] | Modulus [Ncm$^{-2}$] | Hardness [Kgf] | Brittleness [%] | Set temp [° C.] | Modulus [Ncm$^{-2}$] | Hardness [Kgf] | Brittleness [%] |
| 0 | 27 | 0.303 | 0.489 | 82.7 | 26 | 0.264 | 0.322 | 81.3 | | | | |
| 20 | 31 | 0.31 | 0.72 | 77.6 | 29 | 0.348 | 0.72 | 78.9 | 24 | no gel | no gel | no gel |
| 40 | 37 | 0.353 | 2.14 | 74 | 38 | 0.372 | 2.53 | 78.1 | 30 | 0.304 | 1.15 | 72.3 |
| 60 | 49 | 0.399 | 6.33 | 81.1 | 45 | 0.39 | 5.97 | 78.5 | 39 | 0.452 | 20.4 | 78.8 |

Effect of Calcium

The effect of addition of a low level of calcium (2 mM) on the properties of the gels is shown in Table XIII. In the case of the control and the samples treated with 5 mM base the addition of calcium increased the setting temperature and Lowered setting temperature Lowered melting temperature Modified gel characteristics Single gelation temperature

TABLE XIII

Effect of calcium on the properties of gels prepared from gellan gum prototypes
[0.5% w/w gum, in deionised water]

| Treatment | Set temp [° C.] | | Modulus [Ncm$^{-2}$] | | Hardness [Kgf] | | Brittleness [%] | | Elasticity [%] | |
|---|---|---|---|---|---|---|---|---|---|---|
| | 0 mM | 2 mM | 0 mM | 2 mM | 0 mM | 2 mM | 0 mM | 2 mM | 0 mM | 2 mM |
| Control | 53 | 61 | 0.354 | 0.372 | 1.690 | 3.39 | 77.2 | 78.5 | 42.1 | 52.9 |
| 5 mM TSP | 33 | 43 | 0.312 | 0.364 | 1.020 | 2.49 | 78.4 | 74.3 | 49.0 | 34.1 |
| 5 mM Na$_2$CO$_3$ | 38 | 49 | 0.334 | 0.388 | 0.953 | 2.52 | 75.9 | 72.0 | 55.3 | 50.5 |
| 12.5 mM TSP | 27 | 30 | 0.303 | 0.468 | 0.489 | 1.85 | 82.7 | 70.9 | 66.3 | 26.2 |
| 30 mM Na$_2$CO$_3$ | no gel | 30 | no gel | 0.77 | no gel | 4.92 | no gel | 54.3 | no gel | 26.4 | the hardness of the gels but had little effect on the modulus, brittleness and elasticity. Addition of calcium to samples treated with 12.5 mM base had less of an effect on the setting temperature but had a greater effect on the overall texture. It resulted in an increase in modulus, and hardness coupled with a decrease in brittleness and elasticity. The sample treated with 30 mM base did not gel in the absence of added calcium. The combined effect of calcium and sucrose was investigated using the sample treated with 30 mM base. A comparison is made to KELCOGEL LT. The effect of calcium on the modulus and brittleness of the gels is shown in FIGS. 1 and 2 respectively.

The sample treated with 30 mM Na$_2$CO$_3$ is almost devoid of substituents and would therefor be expected to have similar properties to KELCOGEL LT. FIGS. 1 and 2 show that it has a similar response to calcium but has a lower modulus and increased brittleness (softer, more flexible gels) compared to the KELCOGEL LT. Addition of sucrose reduces the calcium required for optimum modulus and at 60% results in a dramatic loss of gel modulus. This is the same behaviour as has been seen with KELCOGEL F (FIG. 3). It is believed that the sugar inhibits the aggregation of the gellan resulting in softer more flexible gels.

The results of these experiments lead to the following conclusions:

Conclusions

1. Treatment of gellan gum fermentation broth with weak base prior to recovery of the gellan gum results in similar benefits to those described for treatment of the reconstituted gellan gum namely:

EXAMPLE 6

Concentrated Jelly Block/Dry Mix Dessert Jelly

Concentrated jelly block

| Ingredients | [%] |
|---|---|
| Sucrose | 22.5 |
| Corn syrup (42DE) | 22.5 |
| Weak base treated Gellan gum* | 0.8 to 1.5 |
| sodium citrate | 0.5 to 1.0 |
| citric acid | 0.5 to 1.0 |
| calcium lactate | 0.0 to 0.5 |
| colour and flavour | to suit |
| water | to 100 |

*Prepared by treatment of gellan gum fermentation broth with 5 mM weak base (TSP, Na$_2$CO$_3$) for 10 minutes at 94° C.).

Preparation

1. Blend the modified gellan gum with the sucrose and sodium citrate then disperse in the water.
2. Heat to 90° C. whilst mixing then add the corn syrup (prewarmed).
3. Dissolve the citric acid, colour, flavour and calcium lactate in a small volume of water and add to the mix.
4. Deposit into moulds and allow to set.

The jelly concentrate can be diluted with water in the ratio of 1:2 to 1:3 gel:water and will re-melt when heated to approximately 95° C. Upon cooling of the diluted system a gel is formed that has similar textural properties to those of a gelatin dessert jelly (Table XIV).

Alternatively, the modified gellan product can be formulated for direct make-up in hot water as a dry mix or Ready to eat dessert jelly in either water or dairy systems.

TABLE XIV

Comparison of Texture of dessert jellies prepared by dilution of a concentrated jelly block (55% sugar, 1.2% gellan diluted 1:2.66 gel:water).

| Sample | Modulus (Ncm$^{-2}$) | Hardness (kgf) | Brittleness (%) | Elasticity (%) |
|---|---|---|---|---|
| Gelatin dessert jelly | 0.309 | 1.04 | 75.9 | 26.5 |
| Gellan sample 1 | 0.520 | 1.18 | 61.2 | 24.8 |
| Gellan sample 2 | 0.375 | 2.10 | 76.0 | 37.6 |

Gellan sample 1 prepared using gellan recovered from broth treated with 5 mM TSP. Gellan sample 2 prepared using gellan recovered from broth treated with 5 mM Na$_2$CO$_3$.

EXAMPLE 7

Cooling and Heating Profiles of Gellan Gum Gels 0.5% w/w gellan gum gels in 2 mM calcium were prepared from
a) untreated [HA] gellan gum;
b) gellan gum treated with 5.44 mM STPP at 90° C.

Figure 4A:
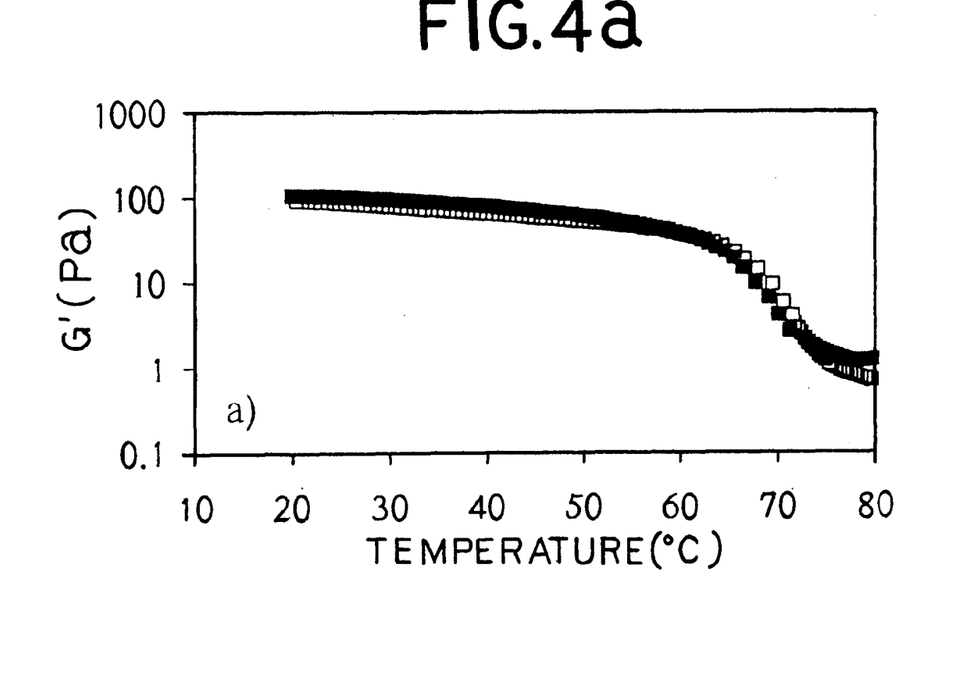
FIG. 4a is a graph showing the heating profile for an untreated 0.5% gellan gum gel.
Figure 4B:
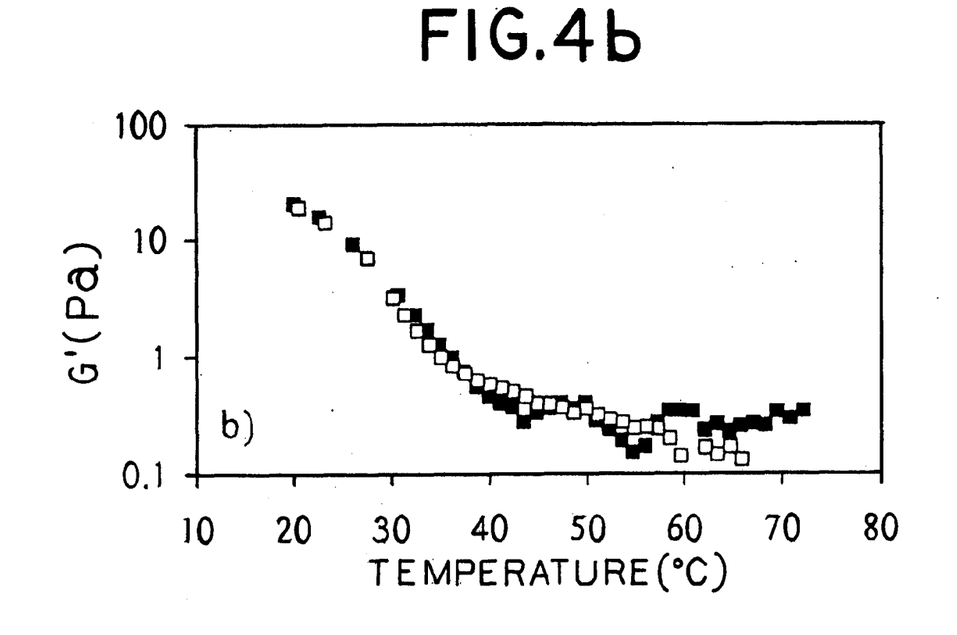
FIG. 4b is a graph showing the heating profile for a 0.5% gellan gum gel treated with sodium tripolyphosphate.

FIGS. 4a) and b) show the profiles obtained and emphasize the effect of the treatment according to the invention on respective gellan gum gels.

The Examples [particularly Example 4] illustrate the key differences between the effect of strong base and weak base treatment of high acyl gellan gum.

This work shows that treatment of reconstituted high acyl gellan gum or native broth with weak bases such as phosphates and carbonates at temperatures above the helix-coil transition of the gum results in preferential removal of the glycerate substituents. This increase in the acetate/glycerate ratio (A/G ratio) leads to improved rheological properties. In particular, the ability to produce gellan gum gels with the characteristic soft, elastic texture of high acyl gellan but with a dramatically reduced setting temperature. Furthermore, deacylation under these mild conditions produces a low acyl gellan which forms gels of increased brittleness (more elastic). The use of weak base possibly leads to a slower reaction with a kinetic effect on the result thereof.

What is claimed is:

1. A process for preparing a gellan gum containing product comprising the steps of:
   (a) providing a native gellan gum having linear tetrasaccharide repeat units of glucose residues having attached acetate and glycerate substituent groups;
   (b) treating the native gellan gum with a weak base for a time and at a temperature effective for reducing the total number of acetate and glycerate substituent groups on the repeat units and for removing a greater number of glycerate substituent groups so as to increase the proportion of acetate substituent groups to provide a modified gellan gum having gel-forming properties different from gel-forming properties of the native gellan gum; and
   (c) causing the modified gum to gel during preparation of the gellan gum-containing product.

2. A process according to claim 1 wherein the modified gellan gum has a ratio of acetate substituents to glycerate substituents greater than or equal to 1 and the total number of acetate groups and glycerate groups per repeat unit is greater than or equal to 1.

3. A process according to claim 1 wherein the modified gellan gum has a ratio of acetate substituents to glycerate substituents greater than or equal to 2 and the total number of acetate groups and glycerate groups per repeat unit is between about 0.4 and about 1.

4. A process according to claim 1 wherein the modified gellan gum has lower gelation and melting temperatures as compared to a native gellan gum.

5. A process according to claim 1 wherein the modified gellan gum has a single gelation temperature.

6. A process according to claim 1 wherein the weak base is tetrasodium pyrophosphate, tetrapotassium pyrophosphate, potassium tripolyphosphate, sodium tripolyphosphate, trisodium phosphate, tripotassium phosphate, sodium carbonate, potassium carbonate, sodium bicarbonate, potassium bicarbonate, and combinations thereof.

7. A process according to claim 1 wherein treatment takes place at a temperature between about 90° C. to about 95° C.

8. A process according to claim 1 wherein treatment takes place for a period within the range of about 0.5 to about 20 minutes.

* * * * *